(12) United States Patent
Takiguchi et al.

(10) Patent No.: US 11,917,314 B2
(45) Date of Patent: Feb. 27, 2024

(54) IMAGE SENSOR AND CONTROL METHOD OF IMAGE SENSOR

(71) Applicant: HAMAMATSU PHOTONICS K.K., Hamamatsu (JP)

(72) Inventors: Ryo Takiguchi, Hamamatsu (JP); Shinya Ito, Hamamatsu (JP); Makoto Iwashita, Hamamatsu (JP); Mitsuaki Kageyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 141 days.

(21) Appl. No.: 17/767,141

(22) PCT Filed: Sep. 9, 2020

(86) PCT No.: PCT/JP2020/034181
§ 371 (c)(1),
(2) Date: Apr. 7, 2022

(87) PCT Pub. No.: WO2021/084918
PCT Pub. Date: May 6, 2021

(65) Prior Publication Data
US 2022/0394204 A1    Dec. 8, 2022

(30) Foreign Application Priority Data
Oct. 30, 2019    (JP) .................. 2019-197759

(51) Int. Cl.
*H04N 25/75*    (2023.01)
*G01N 21/64*    (2006.01)

(52) U.S. Cl.
CPC ......... *H04N 25/75* (2023.01); *G01N 21/6456* (2013.01)

(58) Field of Classification Search
CPC ...... H04N 25/75; H04N 25/53; H04N 25/771; H04N 25/77; G01N 21/6456; G01J 1/46; G01J 3/2803; G01J 3/4406
See application file for complete search history.

(56) References Cited

U.S. PATENT DOCUMENTS

RE44,253 E *  6/2013  Gilby .................. G01J 3/28
                                                348/302
8,866,059 B2 * 10/2014  Murata ............. H01L 27/14645
                                                257/431

(Continued)

FOREIGN PATENT DOCUMENTS

CN    107468209 A    12/2017
CN    107852470 A    3/2018

(Continued)

OTHER PUBLICATIONS

International Preliminary Report on Patentability dated May 12, 2022 for PCT/JP2020/034181.

*Primary Examiner* — Chiawei Chen
(74) *Attorney, Agent, or Firm* — Faegre Drinker Biddle & Reath LLP

(57) ABSTRACT

An image sensor includes a plurality of pixels. Each pixel includes a photoelectric conversion portion, a reset gate for controlling removal of a charge accumulated in the photoelectric conversion portion, a charge accumulation portion, an accumulation gate for controlling a transfer of the charge from the photoelectric conversion portion to the charge accumulation portion, and a readout gate for controlling readout of the charge from the charge accumulation portion. The reset gate removes the charge generated in the photoelectric conversion portion by excitation light. The accumulation gate transfers the charge generated in the photoelectric conversion portion by fluorescence to the charge accumulation portion. The readout gate performs control for reading (Continued)

out the charge after the charge transfer is performed n times. The number n of the charge transfers is set for each pixel.

7 Claims, 10 Drawing Sheets

(56) References Cited

U.S. PATENT DOCUMENTS

| | | | |
|---|---|---|---|
| 9,883,124 B2* | 1/2018 | Sugiyama | H04N 25/46 |
| 11,323,643 B2* | 5/2022 | McElvain | H04N 25/589 |
| 2012/0193743 A1 | 8/2012 | Kawahito et al. | |
| 2012/0326010 A1* | 12/2012 | Mabuchi | H04N 25/621 |
| | | | 250/208.1 |
| 2013/0001404 A1* | 1/2013 | Meynants | H04N 25/77 |
| | | | 257/222 |
| 2015/0296160 A1 | 10/2015 | Tominaga et al. | |
| 2018/0213167 A1 | 7/2018 | Miki et al. | |
| 2018/0227514 A1* | 8/2018 | Takahashi | H04N 25/533 |
| 2018/0288343 A1* | 10/2018 | McCarten | H04N 25/531 |

FOREIGN PATENT DOCUMENTS

| | | |
|---|---|---|
| CN | 107924927 A | 4/2018 |
| JP | 2008-103647 A | 5/2008 |
| JP | 2018-120981 A | 8/2018 |
| JP | 2019-067937 A | 4/2019 |
| WO | WO-2011/043339 A1 | 4/2011 |
| WO | WO-2014/069394 A1 | 5/2014 |

* cited by examiner

Fig.9
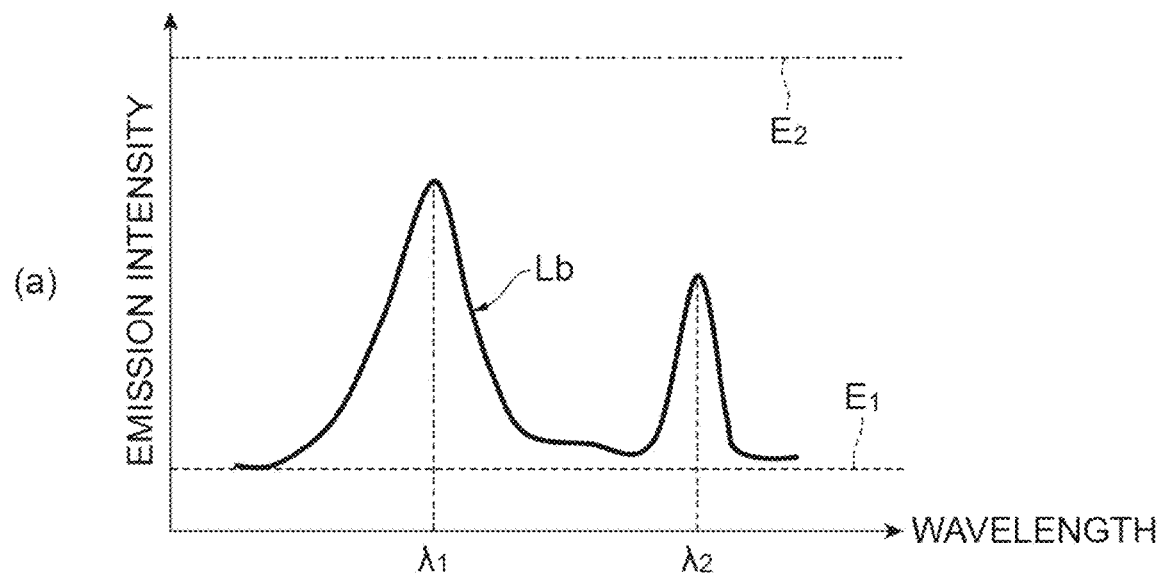
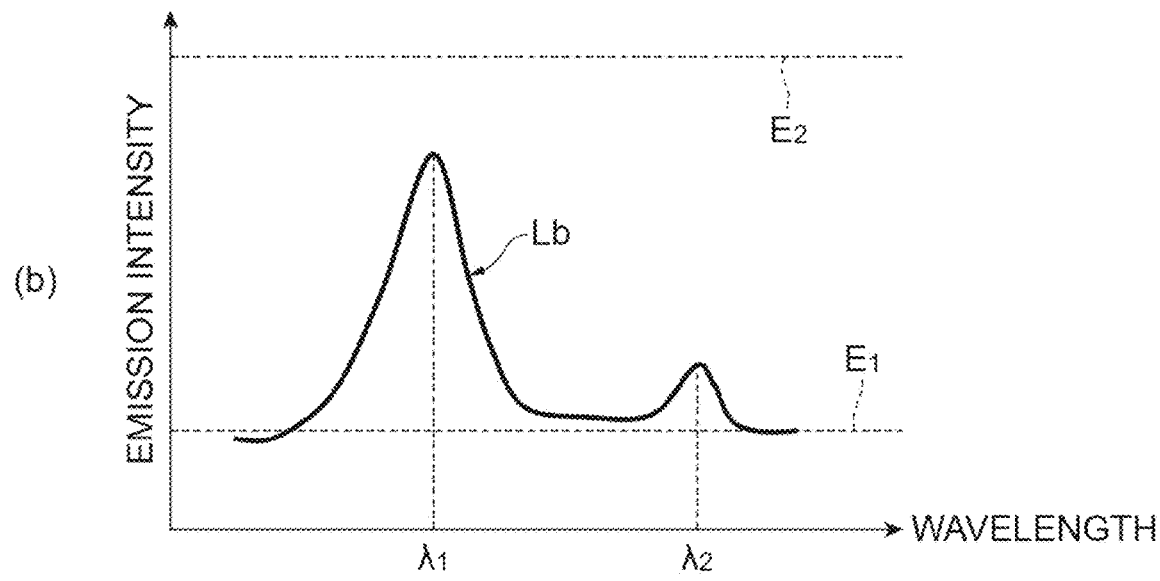

IMAGE SENSOR AND CONTROL METHOD OF IMAGE SENSOR

TECHNICAL FIELD

The present disclosure relates to an image sensor and an image sensor control method.

BACKGROUND ART

Patent Document 1 discloses a technique related to a linear image sensor and a driving method thereof. The linear image sensor includes N pixels arranged one-dimensionally, a signal output line, a charge removal line, and drive control means. Each pixel includes a signal generation unit including a photoelectric conversion element, a readout switch provided between the signal generation unit and the signal output line, and a charge removal switch provided between the signal generation unit and the charge removal line. The signal output line is provided in common to all the pixels for outputting signals acquired in the N pixels. The charge removal line removes the signals acquired in the N pixels.

The drive control means independently instructs each pixel on an operation of temporarily setting the readout switch to an ON state and an operation of temporarily setting the charge removal switch to an ON state. The drive control means sets the readout switch of each pixel to the ON state in mutually different periods, and instructs ON/OFF of the readout switch and the charge removal switch of each pixel by setting, for each pixel, whether to set the charge removal switch in the pixel to the ON state or a timing of setting the charge removal switch in the pixel to the ON state, during a period from when the readout switch is set to the ON state in the pixel to when the readout switch is set to the ON state next time.

Patent Document 2 discloses a technique related to a solid-state imaging device. The solid-state imaging device includes a photoelectric conversion portion of a first conductivity type, a holding portion of the first conductivity type, a floating diffusion portion of the first conductivity type, a charge removal portion, a first transfer portion including a first gate for transferring a charge from the photoelectric conversion portion to the holding portion, a second transfer portion including a second gate for transferring the charge from the holding portion to the floating diffusion portion, and a third transfer portion including a third gate for removing the charge from the photoelectric conversion portion to the charge removal portion. An impurity concentration of a second conductivity type in at least a part of a region under the first gate of the first transfer portion is lower than an impurity concentration of the second conductivity type in a region under the second gate of the second transfer portion and an impurity concentration of the second conductivity type in a region under the third gate of the third transfer portion. In a state where the first transfer portion and the third transfer portion are OFF, a potential barrier of the first transfer portion may be higher than a potential barrier of the third transfer portion.

CITATION LIST

Patent Literature

Patent Document 1: International Publication No. 2014/069394

Patent Document 2: Japanese Patent Application Laid-Open Publication No. 2018-120981

SUMMARY OF INVENTION

Technical Problem

In an image sensor, an intensity of incident light is detected in each of a plurality of pixels. When a light amount of the incident light on the pixel is weak, a detection signal becomes smaller compared to a background noise, and an S/N ratio in the pixel deteriorates. On the other hand, when the light amount of the incident light on the pixel is too large, the pixel is saturated and a magnitude of the detection signal does not correspond to the intensity of the incident light.

For example, when a light intensity of each wavelength after dispersion is detected by a linear image sensor in a spectroscopic analysis apparatus, the light intensity may be weak depending on the wavelength. In this case, when signal amounts of all pixels are uniformly increased, a pixel which detects a light intensity of another wavelength may be saturated. Therefore, it is desirable to be able to increase only the signal amount of the pixel corresponding to the wavelength at which the light intensity is weak.

Further, the image sensor may be desired to detect only one of two light components which are alternately incident. For example, in an emission spectroscopic measurement apparatus, a measurement object is irradiated with excitation light, fluorescence generated in the measurement object is dispersed, and an intensity of the fluorescence for each wavelength is detected by a linear image sensor. In this case, the excitation light is incident on each pixel of the linear image sensor in addition to the fluorescence.

The fluorescence is generated later than the excitation light in general, and thus, the excitation light is first incident on each pixel, and then, the fluorescence is incident after a lapse of time. For performing the measurement with high accuracy, pulse-shaped excitation light is applied a plurality of times, and the intensity of the fluorescence is detected for each wavelength each time. Since the fluorescence intensity is necessary for the analysis of the measurement object, it is desirable to accurately detect the fluorescence intensity while eliminating the influence of the excitation light.

An object of an embodiment is to provide an image sensor and an image sensor control method capable of selectively increasing signal amounts of pixels of a part of a plurality of pixels, and detecting only one of two light components being alternately incident.

Solution to Problem

An embodiment is an image sensor. The image sensor includes a plurality of pixels arranged one-dimensionally or two-dimensionally, and each pixel includes a photoelectric conversion portion for generating a charge in an amount according to an intensity of incident light; a first gate for controlling removal of the charge accumulated in the photoelectric conversion portion from the pixel; a charge accumulation portion provided separately from the photoelectric conversion portion and for accumulating the charge; a second gate provided between the photoelectric conversion portion and the charge accumulation portion and for controlling a transfer of the charge from the photoelectric conversion portion to the charge accumulation portion; and a third gate for controlling readout of the charge from the charge accumulation portion, and the first gate removes the charge generated in the photoelectric conversion portion by incidence of first light from the pixel, the first light and second light being temporally alternately incident, the second gate transfers the charge generated in the photoelectric conversion portion by incidence of the second light to the charge accumulation portion, the third gate performs control for reading out the charge from the charge accumulation portion after the charge transfer to the charge accumulation portion is performed n times (n is an integer of 1 or more), and the number n of the charge transfers is individually set for each pixel.

In the above configuration, when the first light (for example, the excitation light in the emission spectroscopic measurement) is incident on the image sensor, the photoelectric conversion portion of each pixel generates the charge of the amount according to the intensity of the first light. The charge is removed to the outside of the pixel through the first gate. Subsequently, when the second light (for example, the fluorescence in the emission spectroscopic measurement) is incident on the image sensor, the photoelectric conversion portion of each pixel generates the charge of the amount according to the intensity of the second light. The charge is transferred to the charge accumulation portion through the second gate. Further, in the pixel in which the intensity of the second light is sufficient and the S/N ratio is high, for example, the charge can be read out through the third gate for each incidence of the second light.

Further, in the pixel in which the intensity of the second light is not sufficient and the S/N ratio is low, the charge may be accumulated in the charge accumulation portion without performing readout through the third gate until the second light is incident a plurality of times. During the above period, the first light and the second light are repeatedly incident, the charge generated in the photoelectric conversion portion by the first light is removed from the pixel through the first gate, and the charge generated in the photoelectric conversion portion by the second light is accumulated in the charge accumulation portion through the second gate. Then, the charge accumulated in the charge accumulation portion for the number of times of incidence of the second light is read out through the third gate.

As described above, in the above image sensor, the number of the accumulations of the charges by the second light can be individually set for each pixel, and thus, when the intensity of the second light is not sufficient, the signal amount can be increased by increasing the number of the accumulations. Further, the above operation can be performed while eliminating the influence of the first light being incident alternately with the second light. Therefore, according to the above image sensor, signal amounts of pixels of a part of the plurality of pixels can be selectively increased, and only one of the two light components being alternately incident can be detected.

An embodiment is an emission spectroscopic measurement apparatus. The emission spectroscopic measurement apparatus includes the image sensor of the above configuration including the plurality of pixels arranged one-dimensionally; an excitation light source for irradiating a measurement object with excitation light as the first light; and a spectroscopic element for dispersing fluorescence generated in the measurement object by the excitation light, and an arrangement direction of the plurality of pixels in the image sensor is along a dispersing direction of the spectroscopic element, and the image sensor detects an intensity of the fluorescence as the second light after dispersion by the spectroscopic element for each wavelength.

According to the above emission spectroscopic measurement apparatus, the image sensor of the above configuration is provided, and thus, it is possible to selectively increase signal amounts for some wavelengths, and detect only the fluorescence out of the excitation light and the fluorescence which are alternately incident.

An embodiment is an image sensor control method. The image sensor control method is a method for controlling an image sensor comprising a plurality of pixels arranged one-dimensionally or two-dimensionally, and in the image sensor, each pixel includes a photoelectric conversion portion for generating a charge in an amount according to an intensity of incident light; and a charge accumulation portion provided separately from the photoelectric conversion portion and for accumulating the charge, and the control method includes a first step of removing the charge generated in the photoelectric conversion portion by incidence of first light from the pixel, the first light and second light being temporally alternately incident on the image sensor; a second step being alternately repeated with the first step and of transferring the charge generated in the photoelectric conversion portion by incidence of the second light to the charge accumulation portion; and a third step of reading out the charge from the charge accumulation portion after the second step is performed n times (n is an integer of 1 or more), and the number n of the charge transfers is individually set for each pixel.

According to the above control method, in the pixel in which the intensity of the second light is not sufficient and the S/N ratio is low, the charge may be accumulated in the charge accumulation portion without performing readout until the second light is incident a plurality of times. During the above period, the first light and the second light are repeatedly incident, the charge generated in the photoelectric conversion portion by the first light is removed from the pixel, and the charge generated in the photoelectric conversion portion by the second light is accumulated in the charge accumulation portion. Then, the charge accumulated in the charge accumulation portion for the number of times of incidence of the second light is read out.

As described above, in the above control method, the number of the accumulations of the charges by the second light can be individually set for each pixel, and thus, when the intensity of the second light is not sufficient, the signal amount can be increased by increasing the number of the accumulations. Further, the above operation can be performed while eliminating the influence of the first light being incident alternately with the second light. Therefore, according to the above control method, a signal amount of an arbitrary pixel in the plurality of pixels can be selectively increased, and only one of the two light components being alternately incident can be detected.

Advantageous Effects of Invention

According to the embodiments, it is possible to provide an image sensor and an image sensor control method capable of selectively increasing signal amounts of pixels of a part of a plurality of pixels, and detecting only one of two light components being alternately incident.

BRIEF DESCRIPTION OF DRAWINGS

FIG. 9 includes (a), (b) graphs showing distribution examples of a light intensity of fluorescence Lb incident on the image sensor.

DESCRIPTION OF EMBODIMENTS

Hereinafter, embodiments of an image sensor, an emission spectroscopic measurement apparatus, and an image sensor control method will be described in detail with reference to the accompanying drawings. In the description of the drawings, the same elements will be denoted by the same reference signs, and redundant description will be omitted. Further, the present invention is not limited to these examples.

Figure 1:
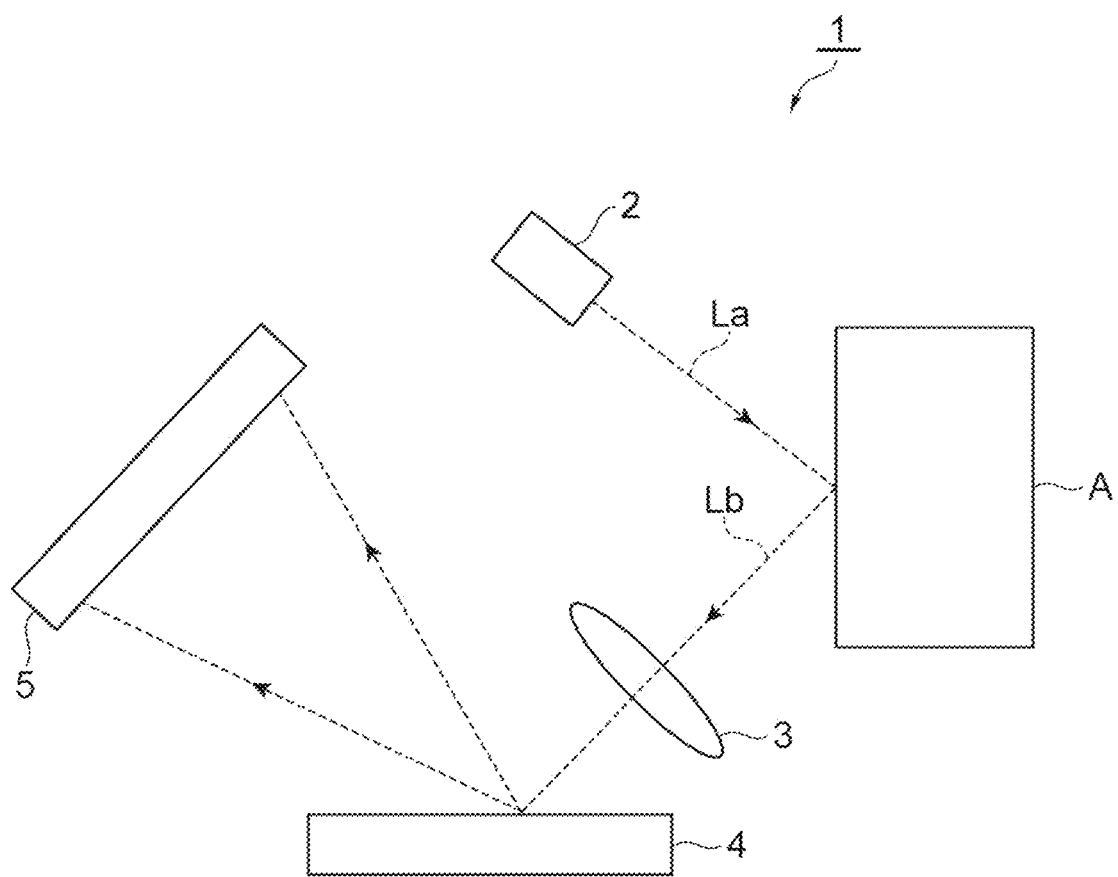
FIG. 1 is a diagram schematically illustrating a configuration of an emission spectroscopic measurement apparatus 1 according to an embodiment.

FIG. 1 is a diagram schematically illustrating a configuration of an emission spectroscopic measurement apparatus 1 according to an embodiment. As illustrated in FIG. 1, the emission spectroscopic measurement apparatus 1 includes an excitation light source 2, a lens 3, a spectroscopic element 4, and an image sensor 5.

The excitation light source 2 is optically coupled to a measurement object A, and irradiates a surface of the measurement object A with excitation light La. The excitation light source 2 emits the excitation light La having a pulse-shaped temporal waveform a plurality of times with a predetermined time interval. The excitation light La is the first light in the present embodiment. The measurement object A is, for example, a solid, and a wavelength of the excitation light La is, for example, 100 nm or more and 1200 nm or less.

In the measurement object A, each time the pulse-shaped excitation light La is received, fluorescence Lb containing a wavelength component according to each constituent element of the measurement object A is generated. The fluorescence Lb is the second light in the present embodiment. Each element constituting the measurement object A emits the fluorescence Lb having a specific wavelength. Further, a light intensity of each wavelength component represents a composition ratio (or mixing ratio) of each element corresponding to the wavelength. Therefore, by detecting a wavelength and an intensity of each wavelength component contained in the fluorescence Lb, a type and a composition ratio (or mixing ratio) of the element constituting the measurement object A can be identified.

The spectroscopic element 4 is optically coupled to the measurement object A via the lens 3. The spectroscopic element 4 receives the fluorescence Lb generated in the measurement object A by the excitation light La, and disperses the fluorescence Lb. The spectroscopic element 4 may be constituted by, for example, a diffraction grating or a prism. The image sensor 5 is optically coupled to the spectroscopic element 4, and receives the fluorescence Lb after the dispersion output from the spectroscopic element 4. The image sensor 5 detects the intensity of the fluorescence Lb after the dispersion by the spectroscopic element 4 for each wavelength, thereby performing spectrum-resolved measurement of the fluorescence Lb.

Figure 2:
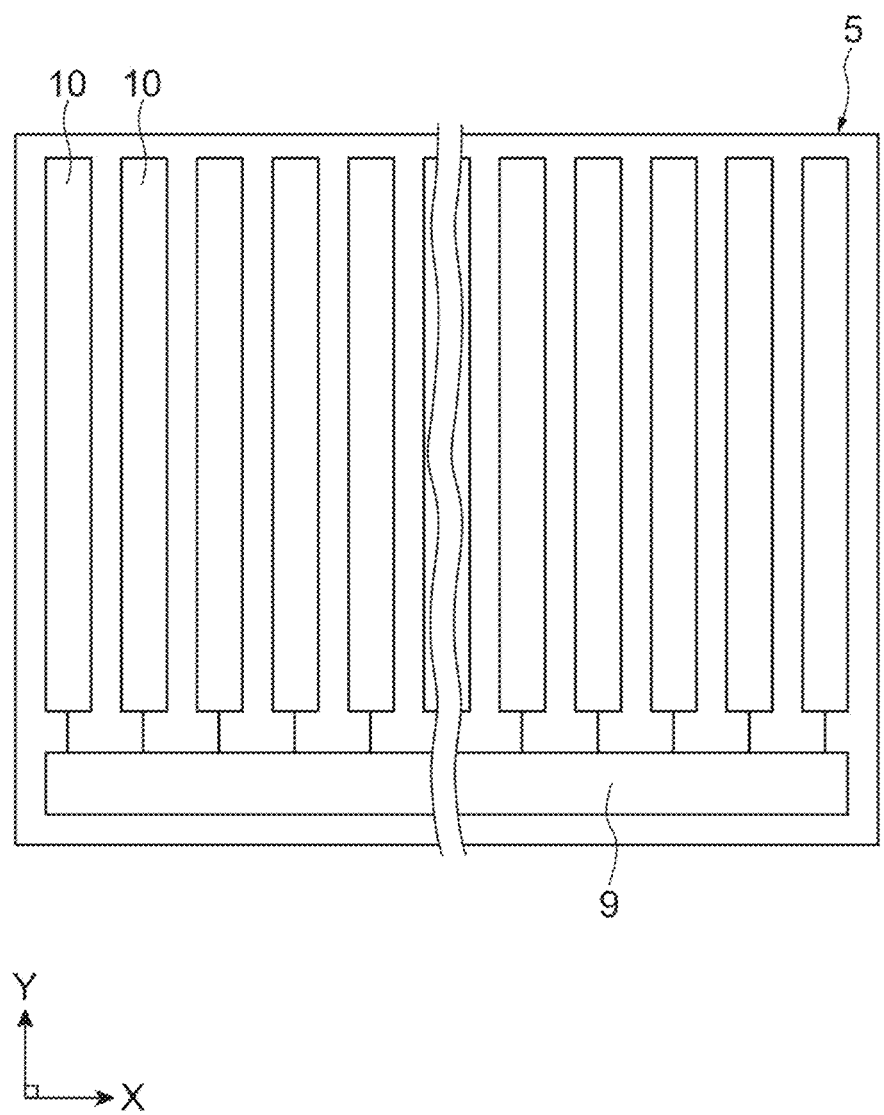
FIG. 2 is a diagram schematically illustrating a configuration of an image sensor 5.

FIG. 2 is a diagram schematically illustrating a configuration of the image sensor 5. As illustrated in FIG. 2, the image sensor 5 includes a plurality of pixels 10 arranged one-dimensionally, and a control unit 9 electrically connected to each pixel 10 and for controlling an operation of the pixel 10. The plurality of pixels 10 are arranged along an X direction, and a planar shape of each pixel 10 is a rectangular shape whose longitudinal direction is a Y direction intersecting (for example, orthogonal to) the X direction. The image sensor 5 is disposed such that an arrangement direction (X direction) of the plurality of pixels 10 is along a dispersing direction (direction in which a plurality of wavelength components are arrayed) by the spectroscopic element 4. Therefore, each pixel 10 detects the light intensity of the corresponding wavelength component.

The excitation light La is incident on a light incident surface of the image sensor 5 in addition to the fluorescence Lb described above. The fluorescence Lb is generated with a delay from the irradiation of the excitation light La, and thus, the excitation light La is first incident, and then, the fluorescence Lb is incident after a lapse of time.

In general, a peak wavelength of the excitation light La is different from any of peak wavelengths of the wavelength components of the fluorescence Lb. However, a light intensity of the excitation light La is much larger than a light intensity of the fluorescence Lb. Further, in general, a spectrum of the excitation light La has a distribution (spread) in a wavelength direction. Therefore, even a wavelength component distant from the peak wavelength of the excitation light La may have an intensity which cannot be ignored compared to each wavelength component of the fluorescence Lb (or is larger than each wavelength component of the fluorescence Lb).

Figure 3:
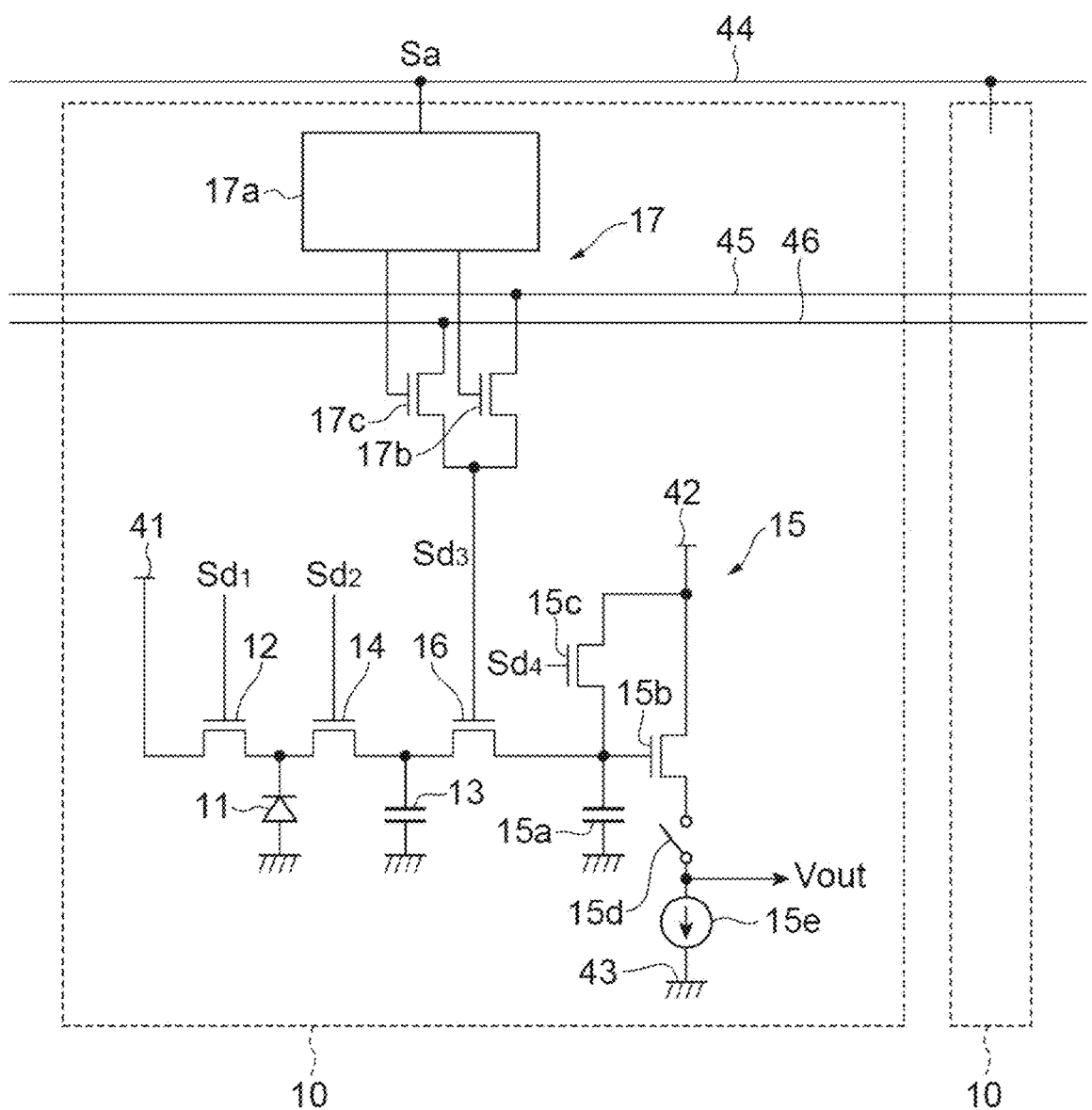
FIG. 3 is a circuit diagram illustrating an electrical configuration of each pixel 10.
Figure 4:
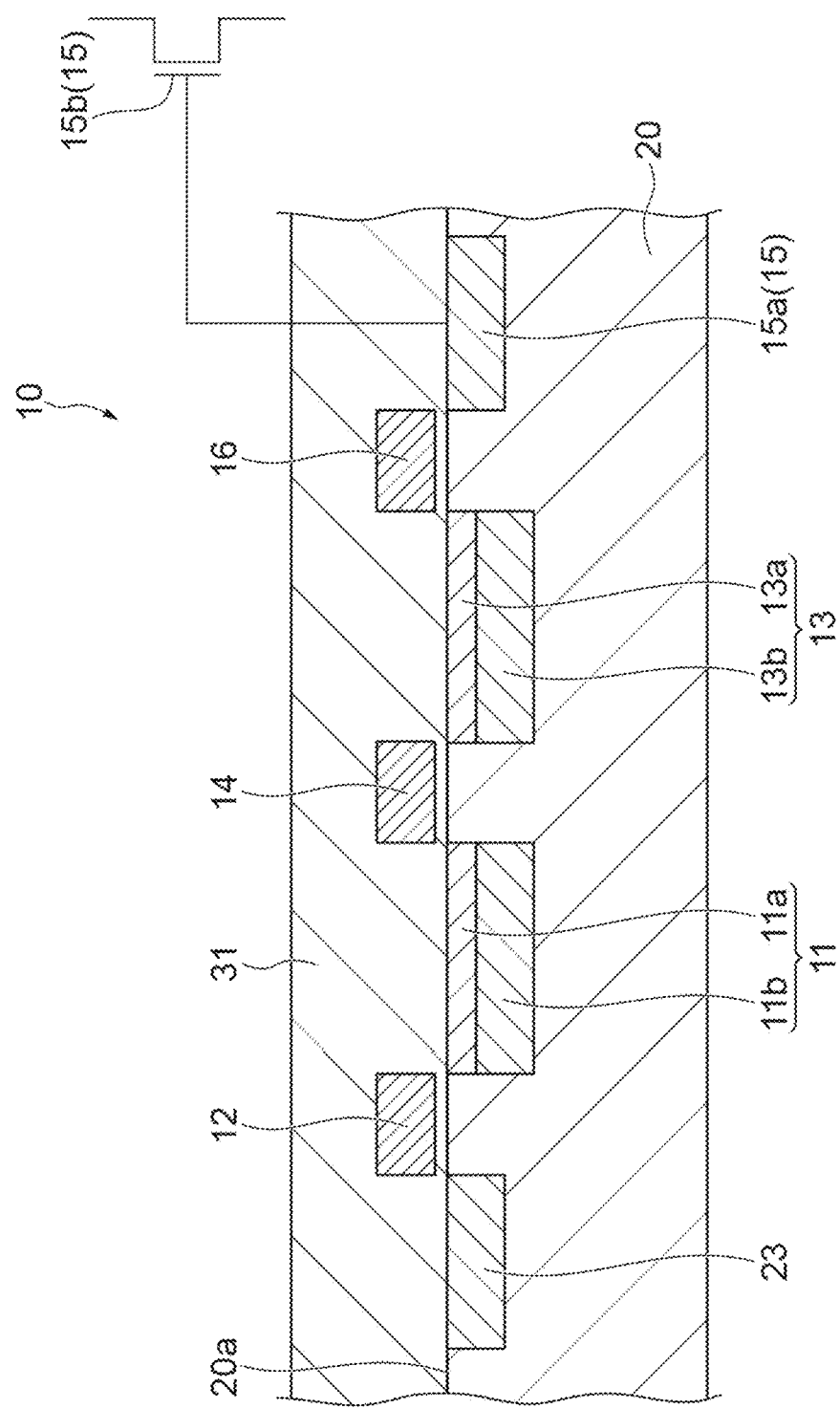
FIG. 4 is a cross-sectional view illustrating a specific structure of each pixel 10.

FIG. 3 is a circuit diagram illustrating an electrical configuration of each pixel 10. Further, FIG. 4 is a cross-sectional view illustrating a specific structure of each pixel 10. As illustrated in FIG. 3 and FIG. 4, the pixel 10 includes a photoelectric conversion portion 11, a reset gate 12, a charge accumulation portion 13, an accumulation gate 14, a voltage conversion portion 15, a readout gate 16, and a pixel circuit unit 17.

The photoelectric conversion portion 11 is a portion for generating a charge according to an intensity of incident light. When the excitation light La is incident, the photoelectric conversion portion 11 generates and accumulates the charge in an amount according to the intensity of the excitation light La. Further, when the fluorescence Lb is incident, the photoelectric conversion portion 11 generates and accumulates the charge in an amount according to the intensity of the fluorescence Lb.

As illustrated in FIG. 4, the photoelectric conversion portion 11 may be constituted by, for example, a photodiode including a high-concentration semiconductor region 11a of a first conductivity type (for example, p-type) formed on a surface 20a of a Si substrate 20, and a high-concentration semiconductor region 11b of a second conductivity type (for example, n-type) located immediately below and in contact with the semiconductor region 11a. The semiconductor regions 11a and 11b can be formed by, for example, ion implantation into the Si substrate 20.

The reset gate 12 is an example of the first gate in the present embodiment. The reset gate 12 controls removal of the charge accumulated in the photoelectric conversion portion 11 from the pixel 10. As illustrated in FIG. 4, the reset gate 12 is an electrode film (for example, polysilicon film) embedded in an insulating film 31 (for example, silicon dioxide film ($SiO_2$)) on the Si substrate 20. The reset gate 12 faces the surface 20a of the Si substrate 20 with a part of the insulating film 31 interposed therebetween, and functions as a gate of a field effect transistor (FET).

When viewed from a normal direction of the surface 20a, a reset drain 23 is provided in a region of the surface 20a at a position where the reset gate 12 is sandwiched between the photoelectric conversion portion 11 and the reset drain. The reset drain 23 is a high-concentration semiconductor region of the second conductivity type (for example, n-type) formed on the surface 20a of the Si substrate 20. The reset drain 23 can be formed by, for example, ion implantation into the Si substrate 20.

The reset drain 23 is electrically connected to a constant potential line 41 (reset potential line) provided in common to the plurality of pixels 10. When the predetermined ON voltage is applied to the reset gate 12, the charge accumulated in the photoelectric conversion portion 11 is transferred to the reset drain 23 through the reset gate 12 and removed from the pixel 10 through the constant potential line 41. When the predetermined OFF voltage is applied to the reset gate 12, the charge accumulated in the photoelectric conversion portion 11 is not transferred to the reset drain 23.

The reset gate 12 is brought into the conductive state in accordance with an incident timing of the excitation light La out of the excitation light La and the fluorescence Lb which are temporally alternately incident. Accordingly, the reset gate 12 removes only the charge generated in the photoelectric conversion portion 11 by the excitation light La from the pixel 10. A signal $Sd_1$ (first signal) for controlling ON/OFF of the reset gate 12 is provided from the control unit 9 illustrated in FIG. 2 to the plurality of pixels 10 as a common signal.

The charge accumulation portion 13 is a portion for accumulating the charge, and is provided separately from the photoelectric conversion portion 11 and adjacent to the photoelectric conversion portion 11. As illustrated in FIG. 4, the charge accumulation portion 13 includes, for example, a high-concentration semiconductor region 13a of the first conductivity type (for example, p-type) formed on the surface 20a of the Si substrate 20, and a high-concentration semiconductor region 13b of the second conductivity type (for example, n-type) located immediately below and in contact with the semiconductor region 13a. The semiconductor regions 13a and 13b can be formed by, for example, ion implantation into the Si substrate 20. In addition, in FIG. 3, for easy understanding, the charge accumulation portion 13 is alternatively indicated by a circuit symbol of a capacitor.

The accumulation gate 14 is an example of the second gate in the present embodiment. The accumulation gate 14 is provided between the photoelectric conversion portion 11 and the charge accumulation portion 13 when viewed from the normal direction of the surface 20a of the substrate 20, and controls a transfer of the charge from the photoelectric conversion portion 11 to the charge accumulation portion 13. As illustrated in FIG. 4, the accumulation gate 14 is an electrode film (for example, polysilicon film) provided separately from the reset gate 12 and embedded in the insulating film 31 on the Si substrate 20. The accumulation gate 14 faces the surface 20a of the Si substrate 20 with a part of the insulating film 31 interposed therebetween, and functions as a gate of an FET.

When the predetermined ON voltage is applied to the accumulation gate 14, the charge accumulated in the photoelectric conversion portion 11 is transferred to the charge accumulation portion 13 through the accumulation gate 14 and accumulated in the charge accumulation portion 13. When the predetermined OFF voltage is applied to the accumulation gate 14, the charge accumulated in the photoelectric conversion portion 11 is not transferred to the charge accumulation portion 13.

The accumulation gate 14 is brought into the conductive state in accordance with a timing after incidence of the fluorescence Lb and before incidence of the excitation light La out of the excitation light La and the fluorescence Lb which are temporally alternately incident. Accordingly, the accumulation gate 14 transfers only the charge generated in the photoelectric conversion portion 11 by incidence of the fluorescence Lb to the charge accumulation portion 13. A signal $Sd_2$ (second signal) for controlling ON/OFF of the accumulation gate 14 is provided from the control unit 9 illustrated in FIG. 2 to the plurality of pixels 10 as a common signal.

The readout gate 16 is an example of the third gate in the present embodiment. The readout gate 16 is provided between the charge accumulation portion 13 and the voltage conversion portion 15 (in the present embodiment, between the charge accumulation portion 13 and a floating diffusion (FD) 15a to be described later) when viewed from the normal direction of the surface 20a of the substrate 20, and controls readout of the charge from the charge accumulation portion 13 to the voltage conversion portion 15. As illustrated in FIG. 4, the readout gate 16 is an electrode film (for example, polysilicon film) provided separately from the reset gate 12 and the accumulation gate 14 and embedded in the insulating film 31 on the Si substrate 20. The readout gate 16 faces the surface 20a of the Si substrate 20 with a part of the insulating film 31 interposed therebetween, and functions as a gate of an FET.

When the predetermined ON voltage is applied to the readout gate 16, the charge accumulated in the charge accumulation portion 13 is transferred to the voltage conversion portion 15 through the readout gate 16. When the predetermined OFF voltage is applied to the readout gate 16, the charge accumulated in the charge accumulation portion 13 is not transferred to the voltage conversion portion 15.

The readout gate 16 performs control for reading out the charge from the charge accumulation portion 13 to the voltage conversion portion 15 after the charge transfer from the photoelectric conversion portion 11 to the charge accumulation portion 13 is performed n times (n is an integer of 1 or more). The number n of the charge transfers can be individually set for each pixel 10.

The pixel circuit unit 17 is a circuit for generating a signal $Sd_3$ for controlling the readout gate 16, and includes a signal control circuit 17a and a pair of transistors 17b and 17c. The signal control circuit 17a is electrically connected to a wiring line 44 provided in common to the plurality of pixels 10. The signal control circuit 17a receives a signal Sa (third signal) from the control unit 9 via the wiring line 44 in each of a plurality of imaging frames. The signal Sa is a signal for instructing each pixel 10 whether to set the readout gate 16 to the ON state or the OFF state at a predetermined timing in each imaging frame.

A control terminal (gate) of each of the transistors 17b and 17c is electrically connected to the signal control circuit 17a. One current terminal (for example, drain) of the transistor 17b is electrically connected to a constant potential line 45 common to the plurality of pixels 10. A potential of the constant potential line 45 corresponds to the predetermined ON voltage of the readout gate 16, and is, for example, the same as the constant potential line 41. The constant potential line 41 and the constant potential line 45 may be provided in common. One current terminal of the transistor 17c is electrically connected to a constant potential line 46 common to the plurality of pixels 10. A potential of the constant potential line 46 corresponds to the predetermined OFF voltage of the readout gate 16, and is, for example, −1.4 V.

The other current terminal (for example, source) of each of the transistors 17b and 17c is electrically connected to the readout gate 16. The signal control circuit 17a sets the transistor 17b to the ON state and sets the transistor 17c to the OFF state in a period in which the readout gate 16 is set to the ON state. Further, the signal control circuit 17a sets the transistor 17b to the OFF state and sets the transistor 17c to the ON state in a period in which the readout gate 16 is set to the OFF state. The signal control circuit 17a sets the readout gate 16 to the ON state or maintains the OFF state of the readout gate 16 at a predetermined timing in each imaging frame based on the signal Sa.

The voltage conversion portion 15 is a portion for converting a charge amount into a voltage signal. The voltage conversion portion 15 of the present embodiment includes the FD 15a, a transistor 15b, a reset gate 15c, a switch 15d, and a current source 15e. The FD 15a is a portion for accumulating the charge, and is provided separately from the photoelectric conversion portion 11 and the charge accumulation portion 13 and adjacent to the charge accumulation portion 13.

As illustrated in FIG. 4, the FD 15a is, for example, a high-concentration semiconductor region of the second conductivity type (for example, n-type) formed on the surface 20a of the Si substrate 20. The FD 15a may be formed by, for example, ion implantation into the Si substrate 20. The readout gate 16 described above is provided between the charge accumulation portion 13 and the FD 15a when viewed from the normal direction of the surface 20a of the substrate 20. In addition, in FIG. 3, for easy understanding, the FD 15a is alternatively indicated by a circuit symbol of a capacitor.

The transistor 15b is, for example, an FET, constitutes a source follower amplifier, and amplifies a voltage according to the charge amount accumulated in the FD 15a. Specifically, a control terminal (gate) of the transistor 15b is electrically connected to the FD 15a, and the small voltage according to the charge amount accumulated in the FD 15a is applied to the control terminal of the transistor 15b. One current terminal (for example, drain) of the transistor 15b is electrically connected to a constant potential line 42 provided in common to the plurality of pixels 10. The other current terminal (for example, source) of the transistor 15b is electrically connected to a reference potential line 43 provided in common to the plurality of pixels 10 via the switch 15d and the current source 15e.

The switch 15d and the current source 15e are connected in series with each other between the other current terminal of the transistor 15b and the reference potential line 43. A potential of the constant potential line 42 is, for example, the same as the constant potential line 41. The constant potential line 41 and the constant potential line 42 may be provided in common.

When the switch 15d is in the connected state, the other current terminal of the transistor 15b generates a voltage signal Vout having a magnitude according to the small voltage applied to the control terminal of the transistor 15b. In other words, the voltage signal Vout having the magnitude according to the charge amount accumulated in the FD 15a is generated at the other current terminal of the transistor 15b. The voltage signal Vout is provided to the outside of the image sensor 5 through a readout line.

The reset gate 15c controls removal of the charge accumulated in the FD 15a from the pixel 10. The reset gate 15c has the same configuration as the reset gate 12 described above. The reset gate 15c is an electrode film (for example, polysilicon film) embedded in the insulating film 31 on the Si substrate 20. The reset gate 15c faces the surface 20a of the Si substrate 20 with a part of the insulating film 31 interposed therebetween, and functions as a gate of an FET.

When viewed from the normal direction of the surface 20a, a reset drain, which is not illustrated, is provided in a region of the surface 20a at a position where the reset gate 15c is sandwiched between the FD 15a and the reset drain. The reset drain is a high-concentration semiconductor region of the second conductivity type (for example, n-type) formed on the surface 20a of the Si substrate 20, similarly to the reset drain 23 described above.

The reset drain is electrically connected to the constant potential line 42. When the predetermined ON voltage is applied to the reset gate 15c, the charge accumulated in the FD 15a is transferred to the reset drain through the reset gate 15c and removed from the pixel 10 through the constant potential line 42. When the predetermined OFF voltage is applied to the reset gate 15c, the charge accumulated in the FD 15a is not transferred to the reset drain.

The reset gate 15c is brought into the conductive state after the voltage signal Vout is read out from the pixel 10, and resets the charge accumulated in the FD 15a. Further, at this time, when the readout gate 16 is simultaneously brought into the conductive state, it is possible to reset the charge accumulated in the charge accumulation portion 13. A signal $Sd_4$ for controlling ON/OFF of the reset gate 15c is provided from the control unit 9 illustrated in FIG. 2 to the plurality of pixels 10 as a common signal.

Figure 5:
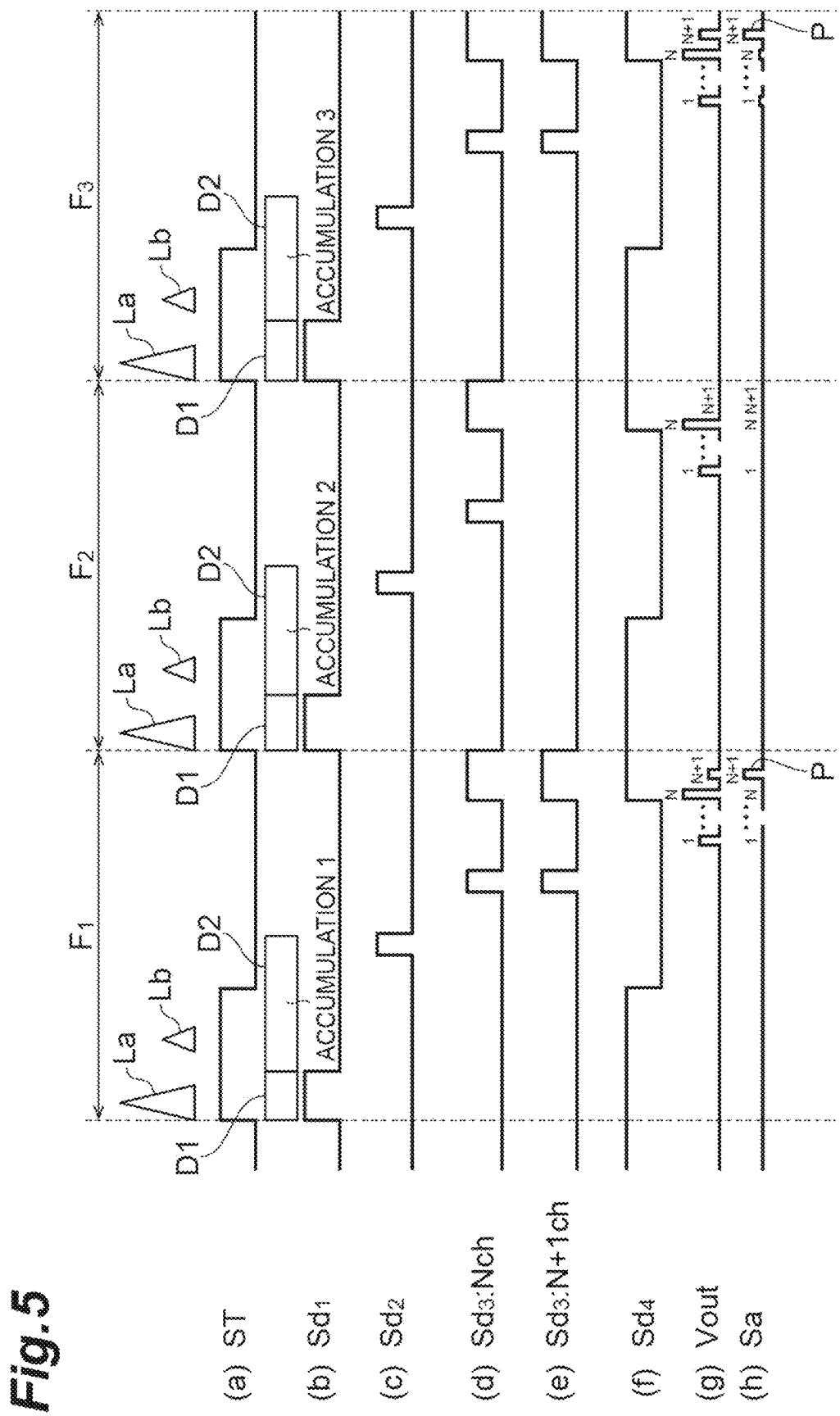
FIG. 5 is a time chart illustrating an operation of each signal of the image sensor 5.
Figure 6:
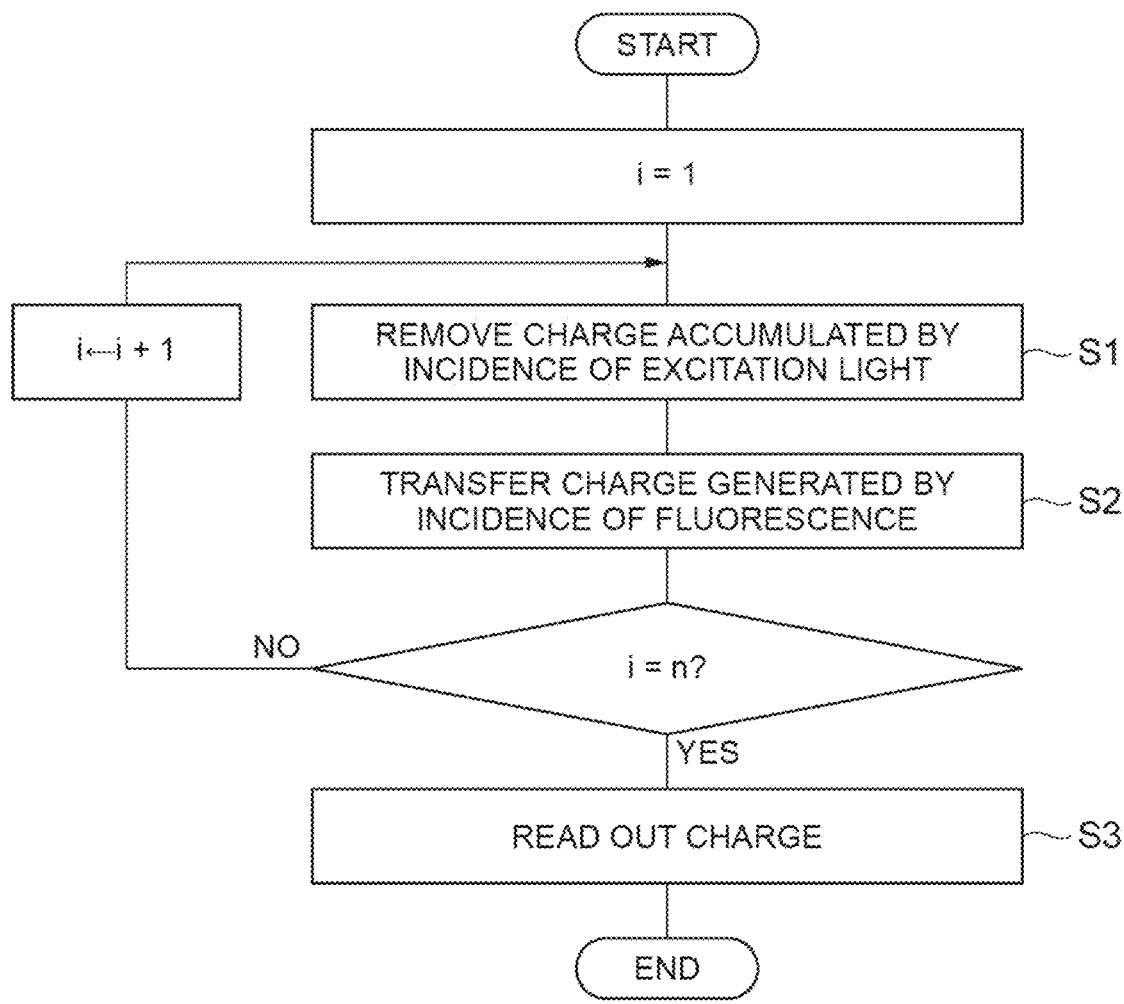
FIG. 6 is a flowchart illustrating an image sensor control method.

The operation of the image sensor 5 having the above configuration will be described together with an image sensor control method according to the present embodiment. FIG. 5 is a time chart illustrating an operation of each signal in the image sensor 5. Further, FIG. 6 is a flowchart illustrating an method for controlling the image sensor.

In FIG. 5, three imaging frames $F_1$ to $F_3$ are illustrated as an example. An emission timing of the excitation light source 2 (see FIG. 1) and each of the imaging frames $F_1$ to $F_3$ are synchronized with each other, and in each of the imaging frames $F_1$ to $F_3$, the excitation light La is first incident, and then the fluorescence Lb is incident after a lapse of time. In FIG. 5, incident timings of the excitation light La and the fluorescence Lb are conceptually indicated by triangles. The horizontal direction of the triangle represents the time, and the vertical direction (height direction) represents the light intensity. In this example, a peak intensity of the excitation light La is larger than a peak intensity of the fluorescence Lb.

As an operation common to the imaging frames $F_1$ to $F_3$, first, as illustrated in (a) in FIG. 5, a frame control signal ST in the control unit 9 becomes a first significant value (for example, Hi). At the same time, as illustrated in (b) in FIG. 5, the signal $Sd_1$ for controlling the reset gate 12 is set to the ON state simultaneously in all the pixels 10. The signal $Sd_1$ maintains the ON state while the excitation light La is incident on the image sensor 5. That is, the charge accumulated in the photoelectric conversion portion 11 by incidence of the excitation light La is removed from the pixel 10 through the reset drain 23 and the constant potential line 41 (a first step S1 in FIG. 6).

After setting the signal $Sd_1$ to the ON state, the signal $Sd_1$ is set to the OFF state after a predetermined period (period D1 in the figure). A timing at which the signal $Sd_1$ is set to the OFF state is common to all the pixels 10, and is after incidence of the excitation light La and before incidence of the fluorescence Lb. When the signal $Sd_1$ is set to the OFF state, the photoelectric conversion portion 11 can accumulate the charge. After the signal $Sd_1$ is set to the OFF state, the fluorescence Lb is incident on the image sensor 5 over a predetermined period (period D2 in the figure), and the photoelectric conversion portion 11 accumulates the charge in an amount according to a light amount of the fluorescence Lb incident on the pixel 10.

After a predetermined period from when the signal $Sd_1$ is set to the OFF state, the frame control signal ST is set to a second significant value (for example, Lo). At this time, as illustrated in (c) in FIG. 5, the signal $Sd_2$ for controlling the accumulation gate 14 is set to the ON state simultaneously in all the pixels 10. Accordingly, the charge generated in the photoelectric conversion portion 11 by incidence of the fluorescence Lb is transferred to the charge accumulation portion 13 through the accumulation gate 14 (a second step S2 in FIG. 6). In addition, the first step S1 and the second step S2 are alternately repeated once for each of the imaging frames $F_1$ to $F_3$.

Subsequently, as illustrated in (d) and (e) in FIG. 5, the signal $Sd_3$ for controlling the readout gate 16 is set to the ON state. Accordingly, the charge accumulated in the charge accumulation portion 13 is read out to the FD 15a of the voltage conversion portion 15 through the readout gate 16 (a third step S3 in FIG. 6). At this time, as necessary for each imaging frame, the signal $Sd_3$ is maintained in the OFF state in some of the pixels 10, and readout of the charge from the charge accumulation portion 13 to the FD 15a is not performed. In this case, in the corresponding pixel 10 in the imaging frame, the charge generated by incidence of the fluorescence Lb remains in the accumulated state in the charge accumulation portion 13.

In the example illustrated in FIG. 5, (d) in FIG. 5 illustrates the signal $Sd_3$ for the N-th pixel 10, and (e) in FIG. 5 illustrates the signal $Sd_3$ for the (N+1)-th pixel 10. Further, as illustrated in (e), in the (N+1)-th pixel 10 in the imaging frame $F_2$, the signal $Sd_3$ is maintained in the OFF state. Therefore, in the (N+1)-th pixel 10 in the imaging frame $F_3$, the charge is read out from the charge accumulation portion 13 after the second step S2 is performed two times. On the other hand, in the N-th pixel 10 in the imaging frames $F_2$ and $F_3$, the charge is read out from the charge accumulation portion 13 after the second step S2 is performed once (that is, each time).

In addition, in the example illustrated in FIG. 5, the charge is read out from the charge accumulation portion 13 after the second step S2 is performed two times in the (N+1)-th pixel 10, and further, the charge may be read out from the charge accumulation portion 13 after the second step S2 is performed n times (n is an integer of 3 or more), and the same operation may be performed in one or two or more pixels 10 other than the (N+1)-th pixel. In other words, in one or two or more arbitrary pixels 10, the charge is read out from the charge accumulation portion 13 after the second step S2 is performed n times (n is an integer of 1 or more).

The signal Sa illustrated in (h) in FIG. 5 is a signal for instructing each pixel 10 whether to set the signal $Sd_3$ to the ON state or maintain the signal $Sd_3$ in the OFF state in each of the imaging frames $F_1$ to $F_3$. The signal Sa includes a plurality of pulse signals arrayed in a time direction. Each pulse signal corresponds to each pixel 10 in one-to-one correspondence, and when the pulse signal corresponding to a certain pixel 10 in a certain imaging frame is a significant value, the signal $Sd_3$ is maintained in the OFF state in the corresponding pixel 10 in the next imaging frame.

In the example illustrated in (h) in FIG. 5, a pulse signal P corresponding to the (N+1)-th pixel 10 of the signal Sa in the imaging frame $F_1$ is a significant value, and thus, the signal $Sd_3$ for the (N+1)-th pixel 10 in the next imaging frame $F_2$ is maintained in the OFF state ((e) in FIG. 5). That is, in the present embodiment, the number of times n described above can be individually set for each pixel 10.

Thereafter, as illustrated in (g) in FIG. 5, the voltage signal Vout is sequentially output from the plurality of pixels 10. Further, after the output of the voltage signal Vout is completed, as illustrated in (f) in FIG. 5, the signal $Sd_4$ is set to the ON state and the reset gate 15c is set to the ON state. Further, at the same time, as illustrated in (d) and (e) in FIG. 5, the signal $Sd_3$ is set to the ON state and the readout gate 16 is set to the ON state. Accordingly, the charges remaining in the FD 15a and the charge accumulation portion 13 are reset.

Figure 7:
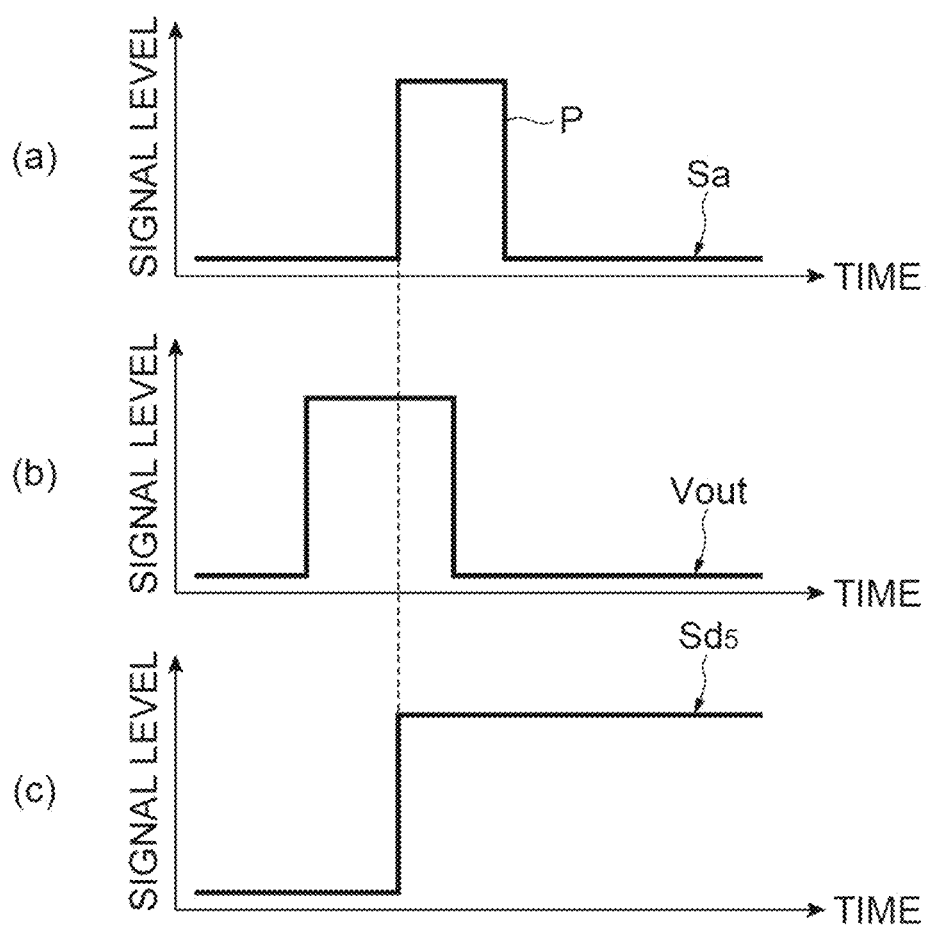
FIG. 7 includes (a) a graph showing an enlarged pulse signal P of a signal Sa for a certain pixel 10, (b) a graph showing a voltage signal Vout output from the pixel 10, and (c) a graph showing an instruction holding signal $Sd_5$ in a signal control circuit 17a of a pixel circuit unit 17.

In addition, (a) in FIG. 7 is a graph showing the enlarged pulse signal P of the signal Sa for a certain pixel 10. (b) in FIG. 7 is a graph showing the voltage signal Vout output from the pixel 10. (c) in FIG. 7 is a graph showing an instruction holding signal $Sd_5$ in the signal control circuit 17a of the pixel circuit unit 17.

As illustrated in FIG. 7, the pulse signal P of the signal Sa may become a significant value at a timing synchronized with the voltage signal Vout. Further, the instruction holding signal $Sd_5$ in the signal control circuit 17a may be set to a significant value over the next imaging frame using the rise of the pulse signal P in a period in which the voltage signal Vout is being output as a trigger. Based on the above instruction holding signal $Sd_5$, the pixel circuit unit 17 can maintain the signal $Sd_3$ in the OFF state in the next imaging frame.

Figure 8:
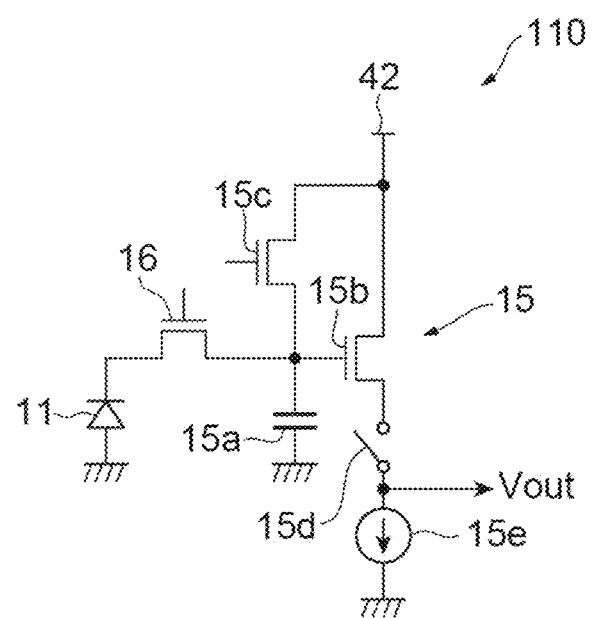
FIG. 8 is a circuit diagram illustrating a configuration of a pixel 110 of an image sensor according to a comparative example.

Effects obtained by the image sensor 5 and the image sensor control method according to the present embodiment described above will be described together with a comparative example. FIG. 8 is a circuit diagram illustrating a configuration of a pixel 110 of an image sensor according to the comparative example. The pixel 110 includes the photoelectric conversion portion 11, the voltage conversion portion 15, and the readout gate 16. These configurations are the same as those in the present embodiment.

When the excitation light La is incident on the pixel 110, the charge according to the excitation light La is accumulated in the photoelectric conversion portion 11. The charge is removed from the pixel 110 by setting the readout gate 16 and the reset gate 15c to the ON state. Next, when the fluorescence Lb is incident, the charge according to the fluorescence Lb is accumulated in the photoelectric conversion portion 11. The charge is transferred to the FD 15a by the readout gate 16, and output to the outside of the image sensor as the voltage signal Vout.

However, in this configuration, the following problem arises. (a) and (b) in FIG. 9 are graphs showing distribution examples of the light intensity of the fluorescence Lb incident on the image sensor, in which the horizontal axis represents the wavelength (position in the arrangement direction (X direction) of the pixels), and the vertical axis represents the light intensity of the fluorescence Lb. In FIG. 9, a dashed line $E_1$ indicates a background noise level, and a dashed line $E_2$ indicates a saturation level.

As shown in (a) in FIG. 9, when the intensities of the fluorescence Lb at the fluorescence wavelengths $\lambda_1$ and $\lambda_2$ specific to respective materials contained in the measurement object A are sufficiently large, the measurement can be performed with the high S/N ratio. However, as shown in (b) in FIG. 9, when the intensity of the fluorescence Lb is sufficiently large at the certain fluorescence wavelength $\lambda_1$, and the intensity of the fluorescence Lb is weak at the other fluorescence wavelength $\lambda_2$, the voltage signal Vout of the pixel 110 corresponding to the fluorescence wavelength $\lambda_2$ is buried in the background noise, and the S/N ratio decreases. Further, when the charge corresponding to a plurality of times of incidence of the fluorescence Lb is accumulated in the FD 15a for increasing the S/N ratio, the charge generated by the excitation light La is also accumulated, and it is difficult to detect only the fluorescence Lb.

For the above problem, the image sensor 5 of the present embodiment performs the following operation as described above. That is, when the excitation light La is incident, the photoelectric conversion portion 11 of each pixel 10 generates the charge in an amount according to the intensity of the excitation light La. The charge is removed from the pixel 10 through the reset gate 12. Subsequently, when the fluorescence Lb is incident, the photoelectric conversion portion 11 of each pixel 10 generates the charge in an amount according to the intensity of the fluorescence Lb. The charge is transferred to the charge accumulation portion 13 through the accumulation gate 14. Further, in the pixel 10 in which the intensity of the fluorescence Lb is sufficient and the S/N ratio is high, the charge is read out through the readout gate 16, for example, for each incidence of the fluorescence Lb (in other words, for each imaging frame).

Further, in the pixel 10 in which the intensity of the fluorescence Lb is not sufficient and the S/N ratio is low, readout through the readout gate 16 is not performed until the fluorescence Lb is incident a plurality of times, and the charge is accumulated in the charge accumulation portion 13. During the above period, the excitation light La and the fluorescence Lb are repeatedly incident, the charge generated in the photoelectric conversion portion 11 by the excitation light La is removed from the pixel 10 through the reset gate 12, and the charge generated in the photoelectric conversion portion 11 by the fluorescence Lb is accumulated in the charge accumulation portion 13 through the accumulation gate 14. Then, the charge accumulated in the charge accumulation portion 13 for the number of times of incidence of the fluorescence Lb is read out through the readout gate 16.

Figure 10:
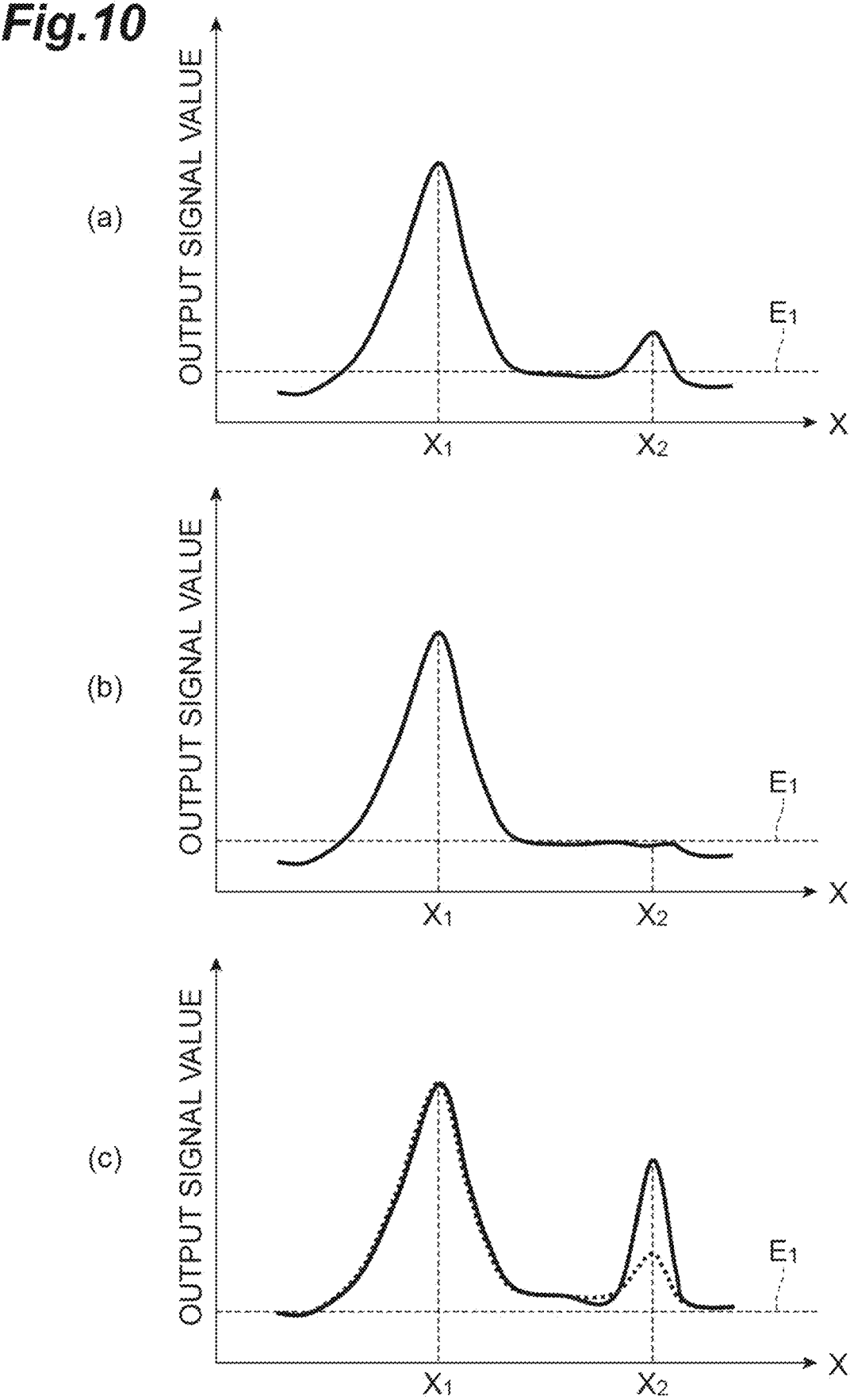
FIG. 10 includes (a)-(c) graphs showing examples of distributions of a voltage signal Vout in an arrangement direction (X direction) of a plurality of pixels 10.

FIG. 10 includes graphs showing examples of distributions of the voltage signal Vout in the arrangement direction (X direction) of the plurality of pixels 10. (a) in FIG. 10 shows the distribution of the voltage signal Vout in the imaging frame $F_1$ of FIG. 5, (b) in FIG. 10 shows the distribution of the voltage signal Vout in the imaging frame $F_2$, and (c) in FIG. 10 shows the distribution of the voltage signal Vout in the imaging frame $F_3$.

As shown in (a) in FIG. 10, when the intensity of the fluorescence Lb is sufficiently large at a position $X_1$ corresponding to a certain fluorescence wavelength, and the intensity of the fluorescence Lb is weak at a position $X_2$ corresponding to another fluorescence wavelength, as shown in (b) in FIG. 10, the charge is accumulated in the charge accumulation portion 13 without performing readout through the readout gate 16 in each of the pixels 10 at and near the position $X_2$. Accordingly, the voltage signal Vout in the imaging frame $F_2$ becomes substantially zero. However, in the next imaging frame $F_3$, the magnitude of the voltage signal Vout from each of the pixels 10 at and near the position $X_2$ corresponds to the two imaging frames (that is, twice as large as that in (a) in FIG. 10). Therefore, the voltage signal Vout can be made larger compared to the background noise level $E_1$, and the S/N ratio can be increased.

As described above, in the image sensor 5 of the present embodiment, the number of the accumulations of the charges by the fluorescence Lb can be individually set for each pixel 10, and thus, when the intensity of the fluorescence Lb is not sufficient, the signal amount can be increased by increasing the number of the accumulations. Further, the operation can be performed while eliminating the influence of the excitation light La being incident alternately with the fluorescence Lb. Therefore, according to the image sensor 5 of the present embodiment, signal amounts of pixels 10 of a part of the plurality of pixels 10 can be selectively increased, and only one (fluorescence Lb) of the two light components being alternately incident can be detected.

As in the present embodiment, the image sensor 5 may include the pixel circuit unit 17 for generating the signal $Sd_3$ for controlling the readout gate 16 in each pixel 10. In this case, the number of times n can be easily set individually for each pixel 10.

As in the present embodiment, the image sensor 5 may include the control unit 9 for providing, to each pixel 10 in each of the plurality of imaging frames, the signal $Sd_1$ being common to the plurality of pixels 10 for controlling the reset gate 12, the signal $Sd_2$ being common to the plurality of pixels 10 for controlling the accumulation gate 14, and the signal Sa for instructing the pixel circuit unit 17 to set ON or OFF of the readout gate 16 for each pixel 10. For example by the above configuration, the above operation of the image sensor 5 can be realized.

As in the present embodiment, each pixel 10 may further include the voltage conversion portion 15 for converting the charge amount into the voltage signal Vout, and the readout gate 16 may be provided between the charge accumulation portion 13 and the voltage conversion portion 15. In this case, the charge of each pixel 10 can be easily read out as the voltage signal Vout.

As in the present embodiment, the voltage conversion portion 15 may include the FD 15a. In this case, the voltage conversion portion 15 can be easily configured.

As described above, the emission spectroscopic measurement apparatus 1 of the present embodiment includes the image sensor 5 including the plurality of pixels 10 arranged one-dimensionally, the excitation light source 2 for irradiating the measurement object A with the excitation light La, and the spectroscopic element 4 for dispersing the fluorescence Lb generated in the measurement object A by the excitation light La. Further, the arrangement direction of the plurality of pixels 10 in the image sensor 5 is along the dispersing direction of the spectroscopic element 4, and the image sensor 5 detects the intensity of the fluorescence Lb after the dispersion by the spectroscopic element 4 for each wavelength.

According to the emission spectroscopic measurement apparatus 1, the image sensor 5 of the present embodiment is provided, and thus, it is possible to selectively increase signal amounts for some wavelengths, and detect only the fluorescence Lb out of the excitation light La and the fluorescence Lb which are alternately incident.

As described above, the image sensor control method of the present embodiment includes the first step S1 of removing the charge accumulated in the photoelectric conversion portion 11 by incidence of the excitation light La from the pixel 10, the excitation light La and the fluorescence Lb being temporally alternately incident on the image sensor 5, the second step S2 being alternately repeated with the first step S1 and of transferring the charge generated in the photoelectric conversion portion 11 by incidence of the fluorescence Lb to the charge accumulation portion 13, and the third step S3 of reading out the charge from the charge accumulation portion 13 after the second step S2 is performed n times (n is an integer of 1 or more). Further, the number of times n is individually set for each pixel 10.

According to the above control method, in the pixel 10 in which the intensity of the fluorescence Lb is not sufficient and the S/N ratio is low, the charge may be accumulated in the charge accumulation portion 13 without performing readout until the fluorescence Lb is incident a plurality of times. During the above period, the excitation light La and the fluorescence Lb are repeatedly incident, the charge generated in the photoelectric conversion portion 11 by the excitation light La is removed from the pixel 10, and the charge generated in the photoelectric conversion portion 11 by the fluorescence Lb is accumulated in the charge accumulation portion 13. Then, the charge accumulated in the charge accumulation portion 13 for the number of times of incidence of the fluorescence Lb is read out.

As described above, in the control method of the present embodiment, the number of the accumulations of the charges by the fluorescence Lb can be individually set for each pixel 10, and thus, when the intensity of the fluorescence Lb is not sufficient, the signal amount can be increased by increasing the number of the accumulations. Further, the above operation can be performed while eliminating the influence of the excitation light La being incident alternately with the fluorescence Lb. Therefore, according to the control method of the present embodiment, a signal amount of an arbitrary pixel 10 in the plurality of pixels 10 can be selectively increased, and only one of the two light components being alternately incident can be detected.

In addition, for obtaining the effects of the present embodiment, a configuration may be considered in which the accumulation gate 14 and the charge accumulation portion 13 are not provided, the photoelectric conversion portion 11 and the FD 15a are connected via the readout gate 16, and the charge according to incidence of the fluorescence Lb of n times is accumulated in the FD 15a. However, in the FD 15a, as illustrated in FIG. 4, the semiconductor region of the second conductivity type (for example, n-type) is exposed on the surface 20a for connection with the wiring line. Therefore, the FD 15a is easily affected by a dark current, and noise components are also accumulated due to the accumulation of the charge for a long time, so that the S/N ratio cannot be increased.

On the other hand, the charge accumulation portion 13 is not connected to the wiring line, and thus, as illustrated in FIG. 4, the semiconductor region 13b of the second conductivity type (for example, n-type) may be embedded by the semiconductor region 13a of the first conductivity type (for example, p-type). Therefore, the charge accumulation portion 13 is hardly affected by the dark current, and the noise component is small even when the charge is accumulated for a long time. Thus, according to the present embodiment, the S/N ratio can be increased.

The image sensor, the emission spectroscopic measurement apparatus, and the image sensor control method are not limited to the embodiments and configuration examples described above, and various modifications are possible.

For example, in the example of the above embodiment, the image sensor is applied to the emission spectroscopic measurement apparatus, and further, the image sensor may be used in various other applications as long as light not being a detection object and light being a detection object are alternately incident. Further, in the example of the above embodiment, the plurality of pixels 10 are arranged one-dimensionally, and further, the plurality of pixels 10 may be arranged two-dimensionally (for example, over a plurality of rows and a plurality of columns). In some applications, the image sensor of the above configuration is useful even when the plurality of pixels 10 are arranged two-dimensionally.

The image sensor of the above embodiment includes a plurality of pixels arranged one-dimensionally or two-dimensionally, and each pixel includes a photoelectric conversion portion for generating a charge in an amount according to an intensity of incident light; a first gate for controlling removal of the charge accumulated in the photoelectric conversion portion from the pixel; a charge accumulation portion provided separately from the photoelectric conversion portion and for accumulating the charge; a second gate provided between the photoelectric conversion portion and the charge accumulation portion and for controlling a transfer of the charge from the photoelectric conversion portion to the charge accumulation portion; and a third gate for controlling readout of the charge from the charge accumulation portion, and the first gate removes the charge generated in the photoelectric conversion portion by incidence of first light from the pixel, the first light and second light being temporally alternately incident, the second gate transfers the charge generated in the photoelectric conversion portion by incidence of the second light to the charge accumulation portion, the third gate, with n being an integer of 1 or more, performs control for reading out the charge from the charge accumulation portion after the charge transfer to the charge accumulation portion is performed n times, and the number n of the charge transfers is individually set for each pixel.

The above image sensor may further include a circuit for generating a signal for controlling the third gate in each pixel. In this case, the number n of the charge transfers can be easily set individually for each pixel.

The above image sensor may further include a control unit for providing, to each pixel in each of a plurality of imaging frames, a first signal being common to the plurality of pixels for controlling the first gate, a second signal being common to the plurality of pixels for controlling the second gate, and a third signal for instructing the circuit to set ON or OFF of the third gate for each pixel. For example by the above configuration, the above operation of the image sensor can be preferably realized.

In the above image sensor, each pixel may further include a voltage conversion portion for converting a charge amount into a voltage signal, and the third gate may be provided between the charge accumulation portion and the voltage conversion portion. In this case, the charge of each pixel can be easily read out as the voltage signal.

In the above image sensor, the voltage conversion portion may include a floating diffusion. In this case, the voltage conversion portion can be easily configured.

The emission spectroscopic measurement apparatus of the above embodiment includes the image sensor of the above configuration including the plurality of pixels arranged one-dimensionally; an excitation light source for irradiating a measurement object with excitation light as the first light;

and a spectroscopic element for dispersing fluorescence generated in the measurement object by the excitation light, and an arrangement direction of the plurality of pixels in the image sensor is along a dispersing direction of the spectroscopic element, and the image sensor detects an intensity of the fluorescence as the second light after dispersion by the spectroscopic element for each wavelength.

The image sensor control method of the above embodiment is a method for controlling an image sensor including a plurality of pixels arranged one-dimensionally or two-dimensionally, and in the image sensor, each pixel includes a photoelectric conversion portion for generating a charge in an amount according to an intensity of incident light; and a charge accumulation portion provided separately from the photoelectric conversion portion and for accumulating the charge, and the control method includes a first step of removing the charge accumulated in the photoelectric conversion portion by incidence of first light to the outside of the pixel, out of the first light and second light being temporally alternately incident on the image sensor; a second step being alternately repeated with the first step and of transferring the charge generated in the photoelectric conversion portion by incidence of the second light to the charge accumulation portion; and a third step of, with n being an integer of 1 or more, reading out the charge from the charge accumulation portion after the second step is performed n times, and the number n of the charge transfers is individually set for each pixel.

INDUSTRIAL APPLICABILITY

The embodiments can be used as an image sensor and an image sensor control method capable of selectively increasing signal amounts of pixels of a part of a plurality of pixels, and detecting only one of two light components being alternately incident.

REFERENCE SIGNS LIST

1—emission spectroscopic measurement apparatus, 2—excitation light source, 3—lens, 4—spectroscopic element, 5—image sensor, 9—control unit, 10—pixel, 11—photoelectric conversion portion, 11a, 11b—semiconductor region, 12—reset gate, 13—charge accumulation portion, 13a, 13b—semiconductor region, 14—accumulation gate, 15—voltage conversion portion, 15a—floating diffusion, 15b—transistor, 15c—reset gate, 15d—switch, 15e—current source, 16—readout gate, 17—pixel circuit unit, 17a—signal control circuit, 17b, 17c—transistor, 20—substrate, 20a—surface, 23—reset drain, 31—insulating film, 41, 42—constant potential line, 43—reference potential line, 44—wiring line, 45, 46—constant potential line, A—measurement object, D1, D2—period, $F_1$-$F_3$—imaging frame, La—excitation light, Lb—fluorescence, P—pulse signal, Vout—voltage signal.

The invention claimed is:

1. An image sensor comprising:
a plurality of pixels arranged one-dimensionally or two-dimensionally, wherein each pixel includes:
a photoelectric conversion configured to generate a charge in an amount according to an intensity of incident light;
a first gate configured to control removal of the charge accumulated in the photoelectric conversion portion from the pixel;
a charge accumulation portion provided separately from the photoelectric conversion portion and configured to accumulate the charge;
a second gate provided between the photoelectric conversion portion and the charge accumulation portion and configured to control a transfer of the charge from the photoelectric conversion portion to the charge accumulation portion; and
a third gate configured to control readout of the charge from the charge accumulation portion, and wherein
the first gate is configured to remove the charge generated in the photoelectric conversion portion by incidence of first light from the pixel, the first light and a second light being temporally alternately incident,
the second gate is configured to transfer the charge generated in the photoelectric conversion portion by incidence of the second light to the charge accumulation portion,
the third gate is configured to perform control for reading out the charge from the charge accumulation portion after the charge transfer to the charge accumulation portion is performed n times (n is an integer of 1 or more), and
wherein the number n of the charge transfers is individually set for each pixel.

2. The image sensor according to claim 1, further comprising a circuit configured to generate a signal for controlling the third gate in each pixel.

3. The image sensor according to claim 2, further comprising a control unit configured to provide, to each pixel in each of a plurality of imaging frames, a first signal being common to the plurality of pixels for controlling the first gate, a second signal being common to the plurality of pixels for controlling the second gate, and a third signal for instructing the circuit to set ON or OFF of the third gate for each pixel.

4. The image sensor according to claim 1, wherein each pixel further includes a voltage conversion portion configured to convert a charge amount into a voltage signal, and the third gate is provided between the charge accumulation portion and the voltage conversion portion.

5. The image sensor according to claim 4, wherein the voltage conversion portion includes a floating diffusion.

6. An emission spectroscopic measurement apparatus comprising:
the image sensor according to claim 1 comprising the plurality of pixels arranged one-dimensionally;
an excitation light source configured to irradiate a measurement object with excitation light as the first light; and
a spectroscopic element configured to disperse fluorescence generated in the measurement object by the excitation light, wherein
an arrangement direction of the plurality of pixels in the image sensor is along a dispersing direction of the spectroscopic element, and the image sensor is configured to detect an intensity of the fluorescence as the second light after dispersion by the spectroscopic element for each wavelength.

7. An image sensor control method for controlling an image sensor comprising a plurality of pixels arranged one-dimensionally or two-dimensionally, wherein in the image sensor, each pixel includes:
a photoelectric conversion portion configured to generate a charge in an amount according to an intensity of incident light; and
a charge accumulation portion provided separately from the photoelectric conversion portion and configured to accumulate the charge, and the control method comprises:

a first step of removing the charge generated in the photoelectric conversion portion by incidence of first light from the pixel, the first light and a second light being temporally alternately incident on the image sensor;

a second step being alternately repeated with the first step and of transferring the charge generated in the photoelectric conversion portion by incidence of the second light to the charge accumulation portion; and a third step of reading out the charge from the charge accumulation portion after the second step is performed n times (n is an integer of 1 or more), and wherein the number n of the charge transfers is individually set for each pixel.

* * * * *